(12) United States Patent
Geyer et al.

(10) Patent No.: US 8,360,377 B2
(45) Date of Patent: Jan. 29, 2013

(54) TOOL MOUNTING DEVICE

(75) Inventors: Gerhard Geyer, Kulmbach (DE); Norbert Ermer, Mistelgau (DE)

(73) Assignee: Staeubli Tec-Systems GmbH, Bayreuth (DE)

( * ) Notice: Subject to any disclaimer, the term of this patent is extended or adjusted under 35 U.S.C. 154(b) by 276 days.

(21) Appl. No.: 12/734,626

(22) PCT Filed: Nov. 14, 2008

(86) PCT No.: PCT/EP2008/009832
§ 371 (c)(1),
(2), (4) Date: Aug. 16, 2010

(87) PCT Pub. No.: WO2009/062756
PCT Pub. Date: May 22, 2009

(65) Prior Publication Data
US 2010/0301568 A1   Dec. 2, 2010

(30) Foreign Application Priority Data
Nov. 14, 2007   (DE) .................... 20 2007 016 071 U

(51) Int. Cl.
*B23Q 3/12* (2006.01)
*A47F 5/00* (2006.01)

(52) U.S. Cl. ................ 248/309.1; 248/315; 248/220.21; 279/9.1

(58) Field of Classification Search ............. 248/309.1, 248/682, 220.21, 220.22, 230.31, 220.43, 248/223.43, 223.31, 224.7, 314, 315, 229.1; 279/9.1
See application file for complete search history.

(56) References Cited

U.S. PATENT DOCUMENTS

| | | | |
|---|---|---|---|
| 4,281,447 A | 8/1981 | Miller et al. | |
| 4,995,493 A | 2/1991 | Cotsman et al. | |
| 5,816,736 A * | 10/1998 | Kroulik | 403/389 |
| 8,042,408 B2 * | 10/2011 | Geyer et al. | 73/856 |
| 8,079,560 B2 * | 12/2011 | Blackwell | 248/229.1 |
| 2006/0032997 A1 * | 2/2006 | Casimiro et al. | 248/229.1 |
| 2010/0067981 A1 | 3/2010 | Geyer | |

FOREIGN PATENT DOCUMENTS

| | | |
|---|---|---|
| DE | 38 12 527 C2 | 10/1989 |
| DE | 299 22 796 U1 | 8/2000 |
| DE | 202 08 059 U1 | 10/2003 |
| DE | 20 2005 012 600 U1 | 12/2006 |
| DE | 10 2006 009 432 A1 | 9/2007 |
| DE | 10 2006 040 034 A1 | 3/2008 |
| GB | 2 189 769 A | 11/1987 |

* cited by examiner

*Primary Examiner* — Anita M King
(74) *Attorney, Agent, or Firm* — Marshall & Melhorn, LLC

(57) ABSTRACT

The tool mounting device according to the invention comprises a first and second coupling device, wherein the first coupling device comprises at least one receptacle, the second coupling device comprises at least one receptacle pin, and the first or second coupling device comprises a tool suspension. The receptacle comprises a recess and an opening, wherein the opening extends from the first end in the direction of the second end over a length and the length of the opening is smaller than a length of the recess and a width of the opening is greater than or equal to a width of the receptacle pin.

9 Claims, 8 Drawing Sheets

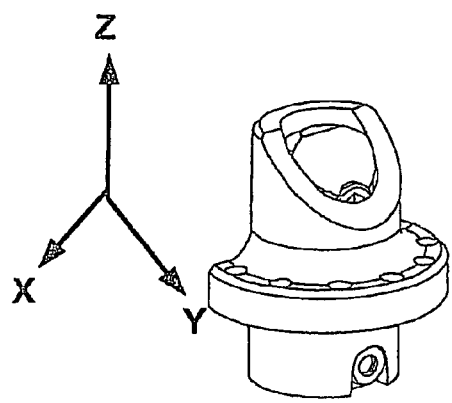
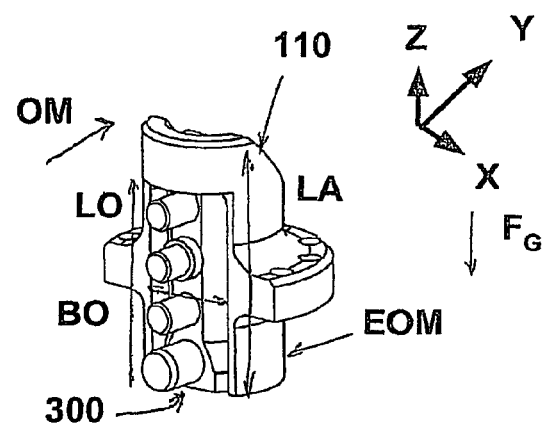
Fig. 2c
Fig. 2b
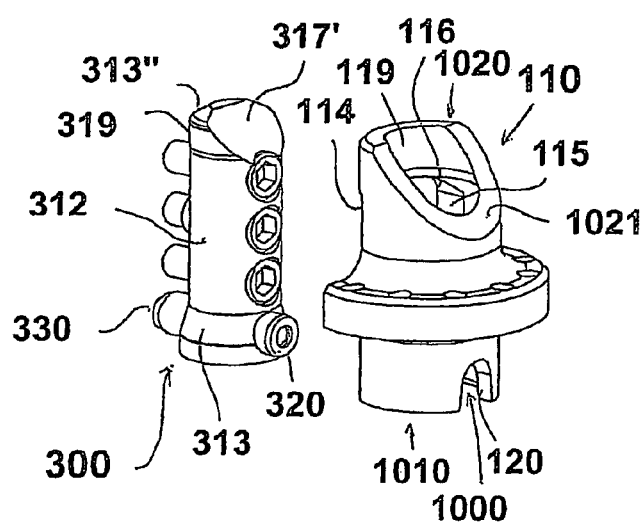
Fig. 2a

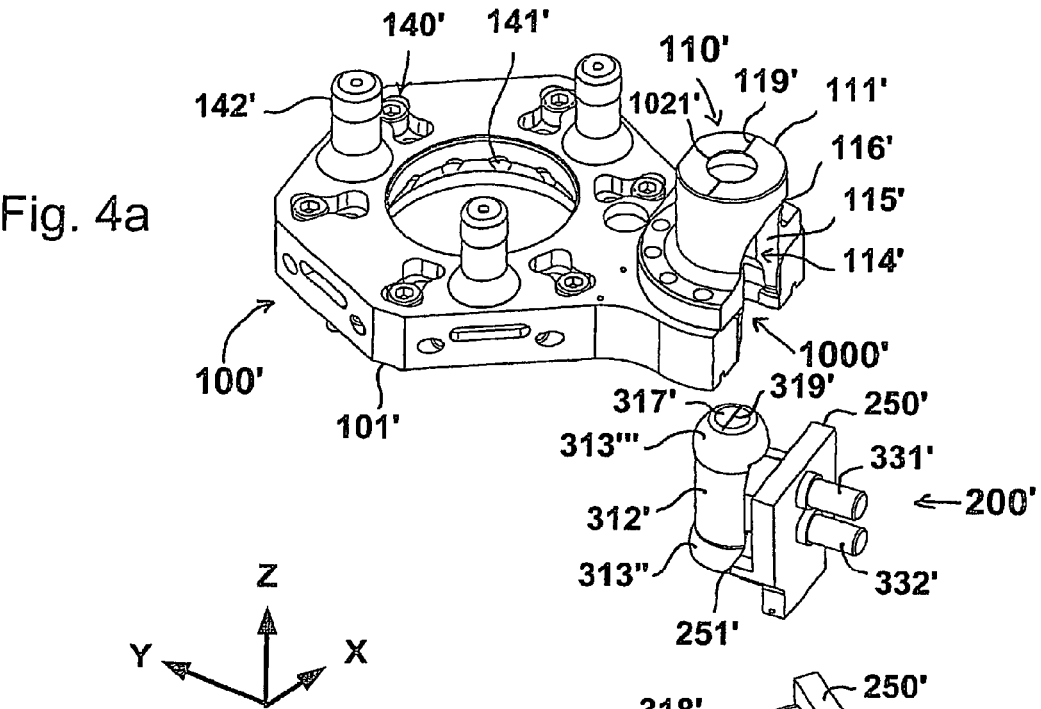
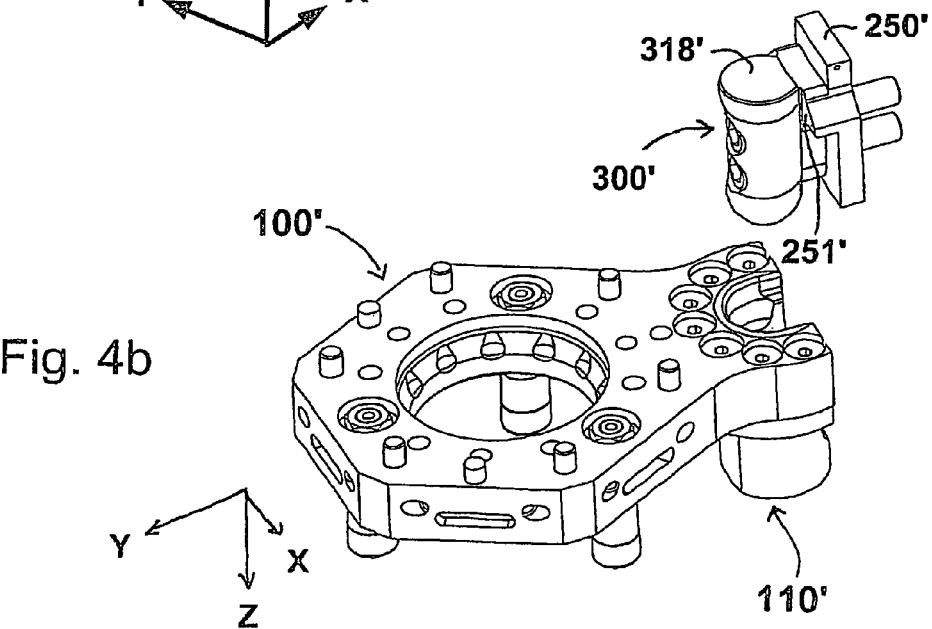
Fig. 4a
Fig. 4b

Fig. 5a
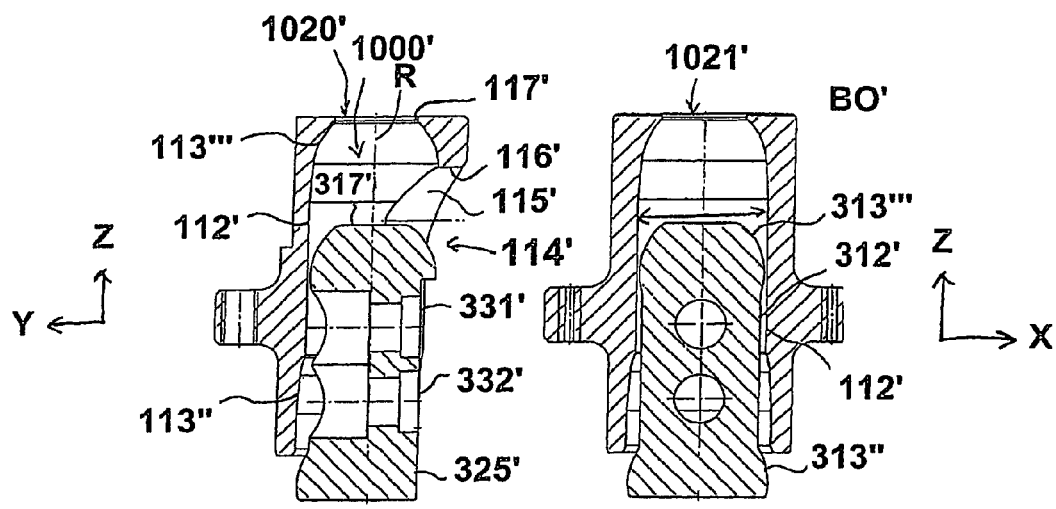
Fig. 5c
Fig. 5b
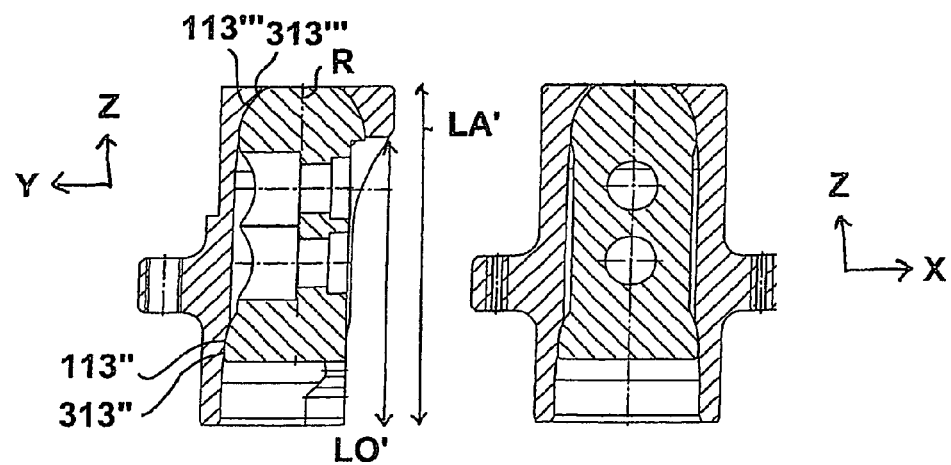
Fig. 5d

TOOL MOUNTING DEVICE

BACKGROUND OF THE INVENTION

The invention relates to a tool mounting device, in particular for tools of robots or manipulators.

Robots which are used for various automatable processing and handling processes are frequently used on automated production lines. Various robots with different types of tools are thereby used, such as for example welding tongs, adhesive guns, riveting tongs or retaining means, such as for example suction cups or clamps.

A critical factor in operation of those production lines resides in the fact that the goods to be processed such as for example automobile bodies, arrive and depart at a constant speed, which causes problems in particular if a robot has completed its operating step very much more rapidly than another robot at a different position within the production line. For this reason, the connection of robots to different exchangeable tools has been adopted, the tools being mounted at a position which is accessible for the robot. Thus it is for example possible to equip a robot in a first step with welding tongs and with a retaining device for a subsequent assembly step. In this way, the individual stations of the production line can be operated efficiently.

Basically, the robot and the tool are connected to each other by means of a coupling device. The tool coupled firstly to the robot is thereby laid down at one position and the new tool is picked up, coupled and the operating step to be performed is implemented. Known tool mounting devices of tool changing devices of this type are often disposed adjacently in order to form a tool station or tool magazine.

Although the robots can already be actuated relatively accurately, a tolerance range of a few millimeters still exists by which the actual position of the robot can deviate from the desired position. This is a problem when picking up or laying down tools in a tool station or in a tool mounting device since the coupling mechanisms on the tool mounting devices can wear rapidly if the tool mounting device has no mounting device for passive or active readjustment of the position of the tool.

The utility model document DE 202 08 059 U1 shows a tool mounting with a first coupling device which can be connected to at least one tool, in particular a robot tool, and a second coupling device which can be connected to a rigid base, the at least one first coupling device having a tool suspension with at least one recess and one receiving means and the second coupling device including a tool receiving plate, a base plate, at least one locating bolt and a mounting device. In addition, the receiving means of the first coupling device can be connected axially to the locating bolt of the second coupling device so that a tool secured on the first coupling device can be picked up by the robot. The disadvantage of the tool mounting device shown there is the great complexity of the coupling devices shown there and also the approach path of a robot which is necessary for this purpose with a small tolerance range.

BRIEF SUMMARY OF THE INVENTION

It is the object of the present invention to produce a tool mounting device which has constructionally simple first and second coupling devices which can be produced favourably and can be connected to each other.

The object is achieved by a subject having the features of claim 1. Advantageous developments are found in the subordinate claims.

The subject according to the invention of the tool mounting device has a first and a second coupling device which can be connected to the first, the first coupling device having at least one receiving means, the second coupling device at least one locating bolt and the first or second coupling device a tool suspension which can be connected to a tool, preferably to a robot tool and the receiving means has a first and a second end along a longitudinal axis.

The receiving means has a recess and an opening, the opening extending from the first end in the direction of the second end over a length and the length of the opening being smaller than a length of the recess and a width of the opening being greater than or equal to a width of the locating bolt. Because of the opening, the locating bolt can slide laterally into the recess, as a result of which, for example in the case of an opening tapering from the outer surface towards the recess, i.e. in particular by means of a bevelled cutting to size of the outer wall, self-adjustment of the locating bolt in the recess is produced.

A method for producing a tool mounting device having a first and a second coupling device which can be connected to the first, the first coupling device having a receiving means and the second coupling device having a locating bolt and either the first or the second coupling device having a tool suspension, comprises at least the following 2 steps.

On the one hand, the locating bolt is produced, the locating bolt having at least one portion extending along a straight axis. The portion thereby represents one end of the locating bolt.

On the other hand, the receiving means is produced. The receiving means is manufactured from one workpiece, a recess being introduced into the workpiece. The workpiece has an outer surface, having an at least partially circumferential outer wall, preferably completely in one portion, between the outer surface and the introduced recess. The workpiece has in addition a first and a second end, the recess being introduced into the first end and extending along a longitudinal axis, i.e. being essentially straight. The recess thereby has a length and has at least one cylindrical and/or frustoconical portion, the axis of the at least one portion extending essentially parallel to the longitudinal axis.

There should hereby be understood by cylindrical or conical portion-shaped, geometries which have slight deviations from the exact geometric shape. Thus for example also spherical slice-shaped portions, i.e. portions which have a curve in the direction of the longitudinal axis, are jointly included within these terms.

In a second step, the steps being able to be implemented also in reverse sequence, an opening is introduced into the workpiece. The opening is a hole in the outer wall, i.e. the opening is essentially introduced between the first and the second end of the workpiece. The opening thereby extends from the first end in the direction of the second end. The opening has a length and a width, the length of the opening being smaller than the length of the recess in the region of the opening. This means that, between the opening end orientated away from the first end and the second end of the workpiece, there is a region in which the outer wall completely surrounds the recess. At the same time, the width of the opening is chosen such that the latter is greater than or equal to the smallest width of the locating bolt.

Advantageously, the ratio of the length of the opening to the length of the recess is greater than 2 to 10, preferably greater than 5 to 10, particularly preferably greater than or equal to 8 to 10. In this way, the approach path of the robot or of the tool carrier is facilitated.

The locating bolt and the receiving means can be connected to each other in a simple efficient manner. The receiving bolt can be placed in the recess laterally via the opening since the locating bolt fits at least in the region of the smallest width through the opening of the receiving means. The recess has a width which corresponds essentially to the greatest width of the locating bolt. Hence the locating bolt in width can be introduced completely into the recess. Subsequently, the receiving means is left (or the locating bolt is left or moved upwards) so that the completely circumferential part of the outer wall of the workpiece of the receiving means engages completely around the locating bolt.

If a weight now acts on the locating bolt or the receiving means because of a tool mounted in a tool suspension, then the completely circumferential edge between the opening end and the second end of the workpiece offers a possibility of taking up the moment acting because of the weight (first moment), the tool being retained in its position. The completely circumferential edge should hereby be understood such that there is at least one closed contour perpendicular to the longitudinal axis of the receiving means, which is closed. In particular, the circumferential edge need not be situated within one plane perpendicular to the longitudinal axis but can also be present graduated or bevelled.

The part of the circumferential edge situated opposite the portion of the edge between opening end and the second end is thereby configured such that said part takes up a moment in the opposite direction to the direction of the first moment, this moment acting in another plane perpendicular to the longitudinal axis. The second end can in addition be open or partially or completely closed. The effective principle of the coupling device therefore resides in taking up the first moment and the opposite moment by means of a circumferential partial portion of the receiving means and thus producing a stable mounting.

The combination of locating bolt and receiving means is advantageous since the first or second coupling device are not brought into engagement with each other over their full length along their axes, i.e. axially, but rather a large part of the approach of a robot extends within one plane and only a small movement perpendicular to this plane is required in order to lay down or pick up the tool. The small movement corresponds essentially in the difference between the opening length and the recess length, or the opening length and the length of the locating bolt within the recess, calculated from the first end of the recess.

Preferably, the recess and/or the outer surface of the workpiece or of the receiving means are produced by turning, which is possible because of the constructional simplicity and is in addition economical.

Advantageously, the locating bolt or the receiving means are mounted on a tool receiving plate or are connected to a tool suspension. In this way, the first and second coupling device are engaged in a larger tool mounting device. In addition, both the locating bolt and the receiving means can form the stationary part. There is termed stationary part that coupling device which is not connected to the tool suspension, i.e. is essentially disposed in a stationary manner. The stationary part takes up the moment acting on the non-stationary part of the coupling devices because of the weight of a tool.

The receiving means can advantageously receive an essentially rotationally symmetrical body so that no edges are situated in the portion of the recess and the wear which occurs normally in particular at the edges can be kept very low.

Furthermore, it is advantageous if the workpiece of the receiving means is at least partially closed at its second end. As a result, the end of the locating bolt can come into contact with the receiving means delimitation of the recess orientated towards the second end, as a result of which a part of the weight load acting due to a tool acts on the stationary part of the first or second coupling device and is taken up by the latter. The circumferential edge of the receiving means is thereby suitable in particular for counteracting the moment acting on the first or second coupling device. Particularly advantageously, the second end has in addition a small hole so that air or gases situated between the receiving means delimitation and the locating bolt can escape and no air or gas cushion can be produced between locating bolt and receiving means delimitation.

It is particularly advantageous if, during production of the receiving means, a transverse boring is introduced at the first end of the workpiece which has the recess, said transverse boring closing in the direction of the second end. The transverse boring can thereby pierce the entire outer wall, however merely a feature which thins the outer wall but does not pierce it is advantageous. Preferably, the transverse boring tapers in the direction of the second end so that the width of the transverse boring reduces from the first end to the second end. In this way, an adjusting pin which is situated in its end position on the closed part of the transverse boring moves into the transverse boring and, because of the tapering—the receiving means rotating slightly—adjusts itself into the end position. The length of the transverse boring along the longitudinal axis can be coordinated to the size and shape of the adjusting pin, i.e. the length can correspond to the dimensions of the adjusting pin but can be substantially larger.

Particularly advantageously, the locating bolt, in the portion extending along a straight axis, is constructed preferably completely from a firstly rotationally symmetrical basic body. The basic body is thereby preferably produced by means of turning since this is particularly simple and convenient. Subsequently, further cuts are introduced into the basic body, the complete rotational symmetry being removed, however in particular the portion of the locating bolt which can come to be situated in the recess maintaining the rotationally symmetrical surface.

Advantageously, the blanks include preferably bored or milled holes for receiving at least one securing bolt, at least one exit of the securing bolt being effected such that the latter emerges in the region of the opening of the receiving means or in the first end of the receiving means. Furthermore, the cut can be a hole for receiving an adjusting pin which engages in the transverse boring. Furthermore, the cuts can intersect the rotationally symmetrical basic body parallel to the axis of rotation, the surface produced by the cut having flat portions. Along the flat surfaces, the locating bolt can be connected to a tool suspension or to a tool receiving means, these surfaces not however being an absolutely necessary precondition of such a type of securing.

It is particularly advantageous if the locating bolt can be brought into a form-fit, detachable engagement at least partially with the recess. Because of the large contact area between the recess and the locating bolt, improved force transmission between the two parts becomes possible, which effects increased stability when suspending or uncoupling or holding the tool by the first and second, or the stationary and the non-stationary, coupling device.

As already mentioned previously, the recess advantageously has at least one portion for partial or complete enclosure of a cylinder or of a truncated cone, the axis of inertia with a greatest moment of inertia of the cylinder and/or truncated cone being configured essentially parallel to the longitudinal axis of the receiving means. Portions of this type can be introduced by means of turning or boring into the receiving means in a particularly simple and accurate manner. The cylindrical and/or frustoconical portions are particularly advantageous if the locating bolt likewise has such cylindrical and/or frustoconical portions on its surface. These can likewise be applied on a basic body in a particularly simple manner. In combination, these features, with the same or a slightly different diameter of the recess and of the locating bolt (the diameter of which is hereby the same or smaller), form an advantageous form-fit engagement.

Preferably, the receiving means is an independent workpiece which can be connected frictionally for example to a tool suspension. It is possible in this way to produce the receiving means in a separate process, which is particularly advantageous if the production process of the receiving means comprises for the most part a turning process. Turning is a hereby preferred alternative since cost savings can be made and the receiving means can be produced more rapidly.

Furthermore, it is advantageous if the receiving means has a transverse boring for receiving an adjusting pin. Rotation of the first coupling device can be prevented by means of the adjusting pin or the transverse boring provided for this purpose. Advantageously, the transverse boring can thereby be configured partially tapering transversely to the direction of the engaging connection in order further to facilitate adjustment of the first coupling device on the adjusting pin or in the transverse boring.

Preferably, the tool mounting device has on the tool suspension at least one opening and preferably a further boring for fixing a tool. The opening of the first coupling device is often intended predominantly for the purpose of inserting the coupling mechanism situated on the tool through the opening. Fixing of the tool with the tool suspension is consequently not absolutely necessarily provided. This fixing can be achieved if the tool suspension preferably has further borings and the tool is fixed in the tool suspension by means of screws and/or other securing means which are inserted through the borings.

Furthermore, it is advantageous if the locating bolt is secured laterally on a side plate of the tool receiving plate. In this way, tools can be fitted on several sides of the tool receiving plate, as a result of which mounting of a plurality of tools in a small space becomes possible. The side plate can thereby be one side of the receiving plate or an independent component which is secured on the tool receiving plate. The tool suspension in this case would be assigned to the first coupling device.

There are possible as material, metals, preferably steel, or plastic materials, or combinations of both materials.

Further advantageous embodiments of the subject can be deduced from the further subordinate claims or the description of the Figures.

BRIEF DESCRIPTION OF THE DRAWINGS

The tool mounting device according to the invention is intended to be explained in more detail with reference to some Figures. There are shown FIGS. 1a, b, c, d a first and second coupling device;

FIGS. 2a, b, c an alternative embodiment of a first and second coupling device;

FIGS. 4a, b an alternative embodiment of a first and second coupling device;

FIGS. 5a, b, c, d an alternative embodiment of a receiving means with a locating bolt in various sections.

DETAILED DESCRIPTION OF THE INVENTION

Figure 3:
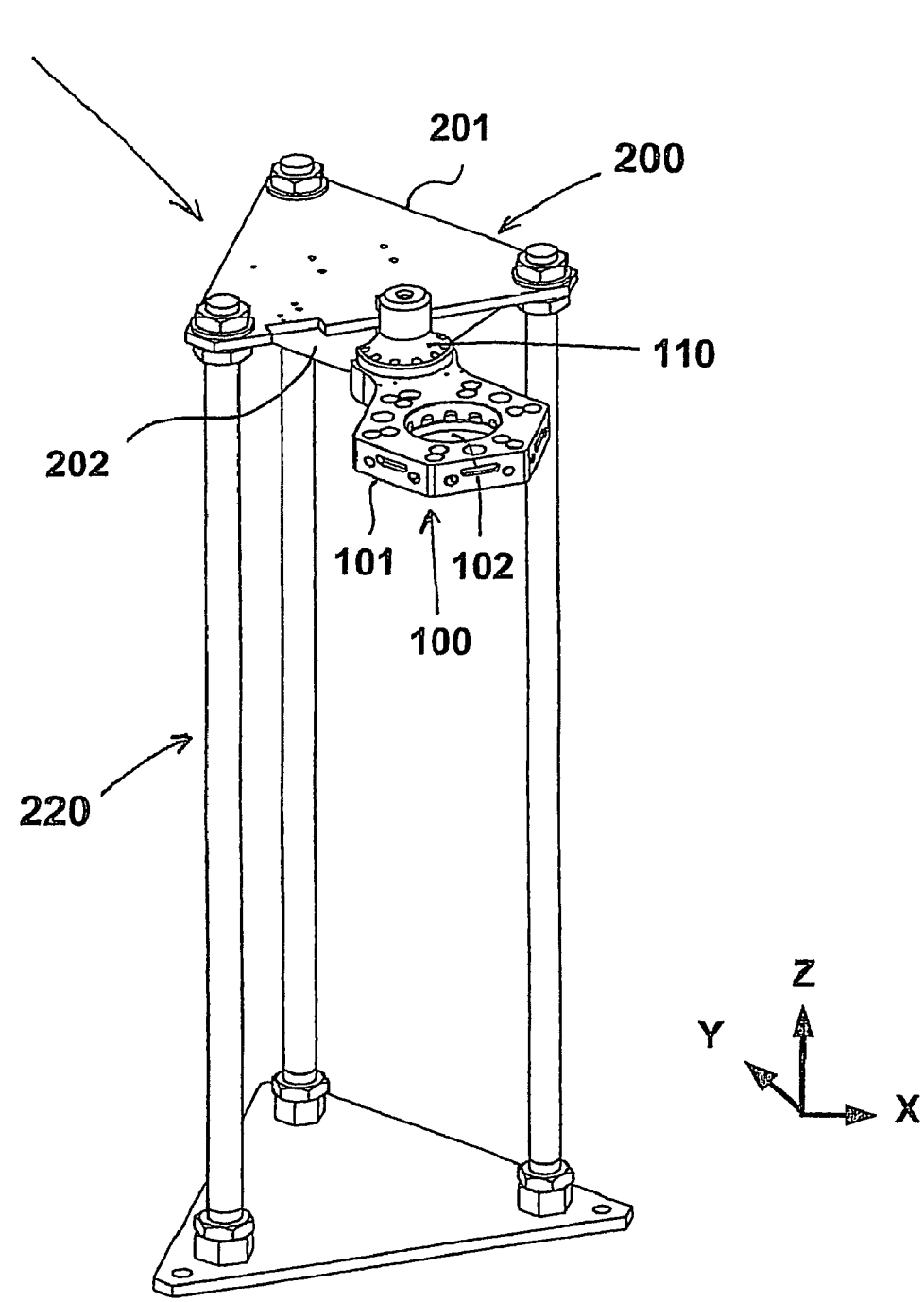
FIG. 3 a tool mounting device with a storage device.

FIG. 3 shows a tool mounting device 1 having a first coupling device 100 and a second coupling device 200. The first coupling device 100 has a tool suspension 101 and a receiving means 110. The tool suspension 101 has in addition an opening 102 through which the coupling fitted on a tool or robot tool can extend in order to be able to be coupled by the robot.

In FIGS. 1a-1d, the first coupling device 100 and the corresponding locating bolt 300 is shown, which have essentially an orientation of their respective axes in the z-axis such that an axis of rotation of the cylinder or the truncated cone of the cylindrical 112, 312 and frustoconical 113, 113', 313, 313' portions of the recess and of the surface of the locating bolt extend likewise in the direction of the z-axis. The first coupling device 100 has a tool receiving means 101 with the opening 102 and further borings 140, the borings 140 being suitable for fixing a tool or robot tool to be connected to the tool suspension 101 on the tool suspension 101. The borings 140 can thereby both go through the tool suspension 101 in the z-axis and be closed borings with threads. Within the opening 102, half-shells 141 are present in addition and improve accurate positioning of the tool or of the robot tool and thus contribute to an increased lifespan in total of the tool and of the tool mounting device and of the robot itself. On the tool suspension 101, the receiving means 110 configured as a separate workpiece 111 is secured by means of screws 1110. There are possible as material both for the receiving means 110 and the tool suspension 101, steels or metals which are designed for the high loading by robot tools.

The receiving means 110 has, in its interior, a recess 1000 which comprises a plurality of differently shaped portions. The recess 1000 has a portion for receiving a cylinder 112 and is extended in the z-direction at its first end 1010 which has the recess by a portion for receiving a truncated cone portion 113.

Figure 1A:
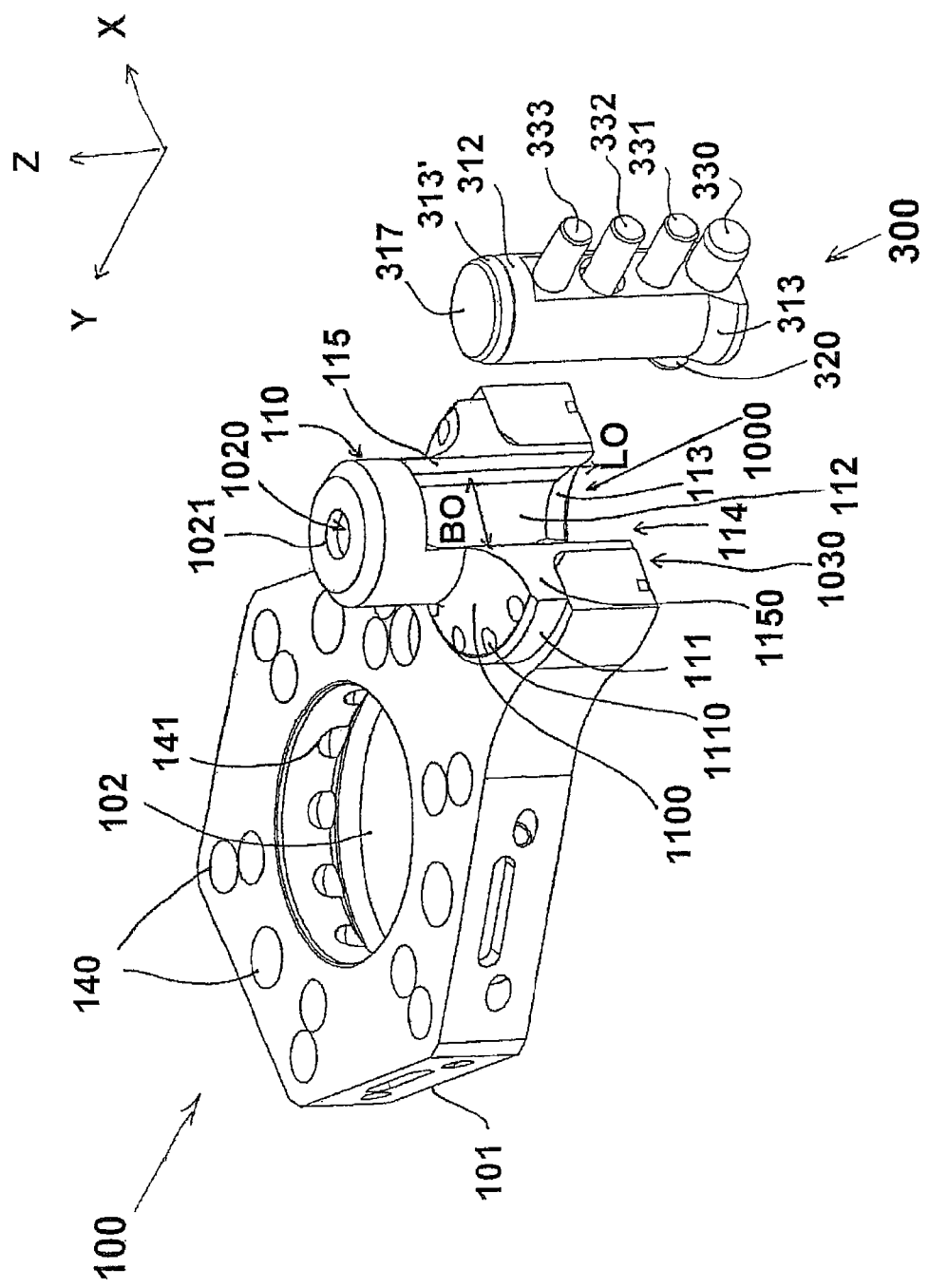
Figure 1B:
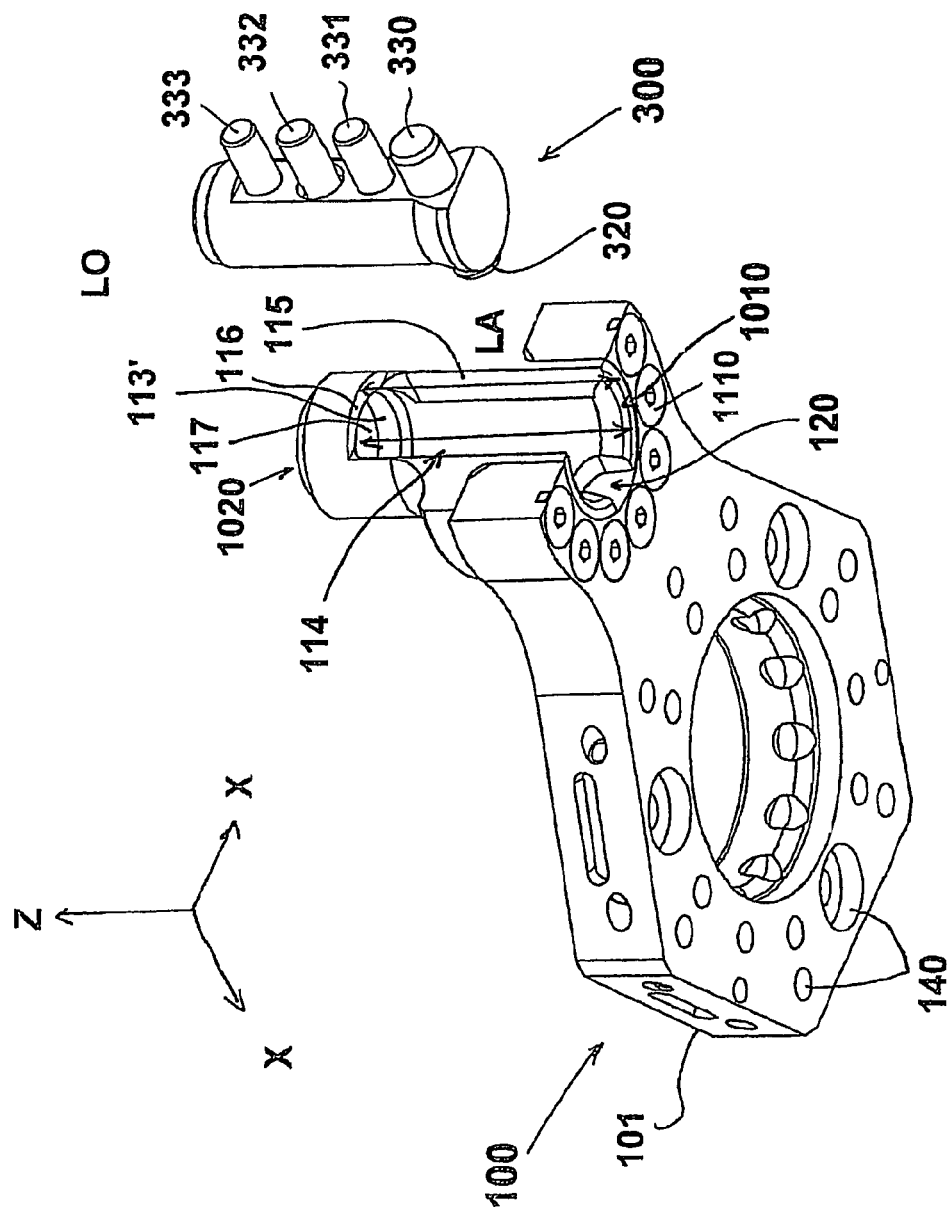

In FIG. 1b, a further portion for receiving a truncated cone 113' can be seen, which is connected in the immediate vicinity to the upper receiving means delimitation 117 of the recess 100. Furthermore, the receiving means 110 has an opening 114 which is delimited by a lateral opening wall 115 and the not-visible oppositely situated opening wall and an upper opening wall 116. Likewise in FIG. 1b, the inner edge screws 1110 with which the receiving means 110 is connected to the tool suspension 101 can likewise be seen.

The opening 114 is thereby chosen such that the locating bolt 300 which has the cylindrical portion 312 and the two frustoconical portions 313 and 313' can be introduced into the recesses 112, 113 of the receiving means. The width BO of the opening 114 is chosen such that it corresponds to the diameter of the locating bolt 300, the opening 114 tapering from the outer surface 1100 to the recess 1000. In this way, the tool suspension 101 can be pushed onto the locating bolt 300 coming from the y-direction, an exact approach not being required because of the self-adjusting opening 114 which is conical in the y-direction since the locating bolt 300 is directed through the opening 114.

In FIG. 1b, it can be detected that the opening 114 and in particular its upper opening wall 116 is chosen such that the recess 1000 has a truncated cone portion 113' which is completely circumferential and perpendicular to the longitudinal axis. This is in contrast to the portions for receiving a cylinder 112 and for receiving a truncated cone 113 which are interrupted because of the opening 114.

The length of the opening LO is smaller than the length of the recess LA in the region of the opening. This means that merely the conical portion 113' of the recess is circumferential and the receiving means 110 is suspended on the locating bolt 300 like a hook, the partial portion of the portion 113' situated above the upper opening wall 116 being pressed onto the corresponding portion 313' of the locating bolt 300 and holding the receiving means 110 in position since the moment of the tool situated in the tool suspension (not illustrated here however) is taken up by the locating bolt. The length ratio LO to LA in the variant shown here is approx. 10 to 9. It should also be noted that there is a slightly projecting upper opening wall 116 in the negative y-direction, which can come in contact, after suspension of the receiving means on the locating bolt, for example with a tool receiving plate and hence the weight of a suspended tool can be supported directly by the tool receiving plate.

At its first end 1010, the receiving means 110 has a transverse boring 120 into which an adjusting pin 320 of the locating bolt 300 can enter. The transverse boring 120 is thereby open towards the first end 1010 and, in the direction of the second end 1020, is conically tapering in width. If the first coupling device 100, now coming from the y-direction and slightly raised in the z-direction, is pushed onto the locating bolt 300, then the adjusting pin 320 comes to abut in a lateral part of the transverse boring 120. If the first coupling device 100 is then left in the negative z-direction, the upper end of the transverse boring 120 lying in the portion 112 comes to lie on the adjusting pin 320, just as the receiving means delimitation 117 comes to lie on the locating bolt delimitation 317.

Figure 1C:
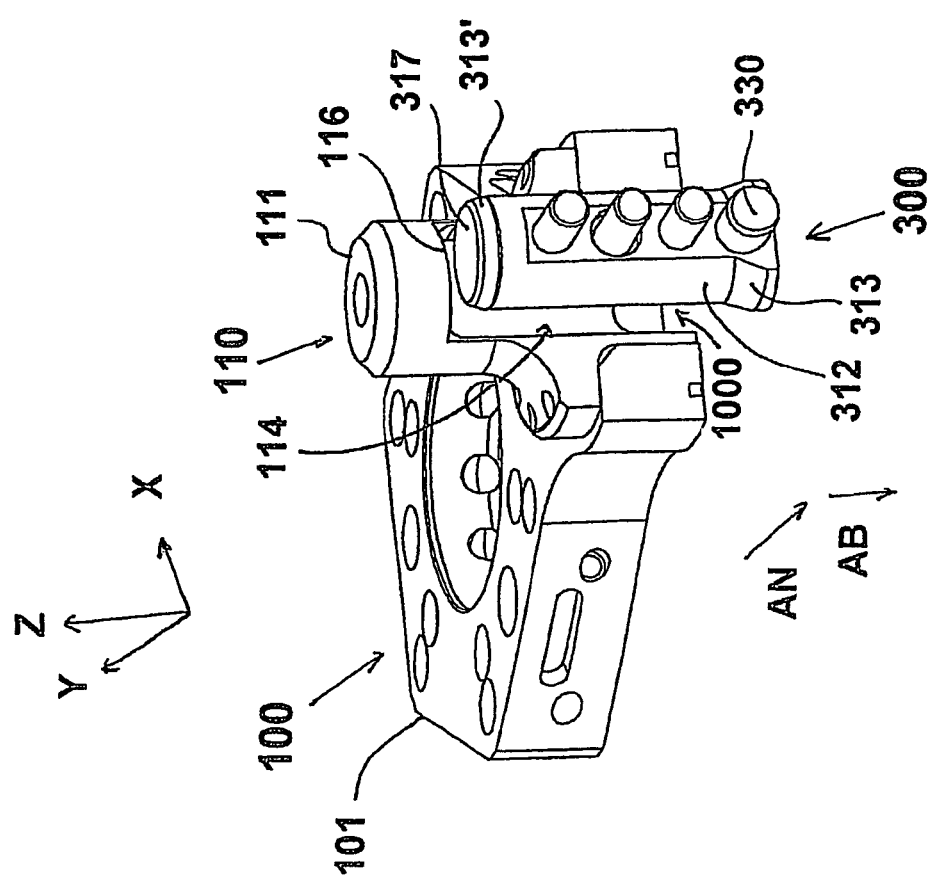

This may be explained once again in more detail with reference to FIG. 1c. The receiving means 110 is firstly moved in the direction AN of the locating bolt 300 so that the cylinder portion 312 of the locating bolt 300 comes in contact with the recess in order to receive a cylinder 112. The first coupling device 100 must thereby be moved in the direction of the locating bolt 300 such that the adjusting pin 320 engages in the transverse boring 120. Otherwise the result is no surface contact between the cylinder portion 312 and the portion of the recess for receiving a cylinder 112 and the first coupling 100 cannot be lowered in the direction AB such that the locating bolt delimitation 317 can come in contact with the receiving means delimitation 117 and a frictional connection between the first coupling device 100 and the locating bolt 300 is provided.

Of course, an embodiment of the locating bolt with an integral adjusting pin or without adjusting pin is also possible, a transverse boring not being necessary in the absence of an adjusting pin.

The receiving means delimitation 117 has a hole 1021 through which air or gases situated between the locating bolt delimitation 317 and the receiving means delimitation 117 can escape. Thus the first coupling device is prevented from "floating" on an air cushion.

Figure 1D:
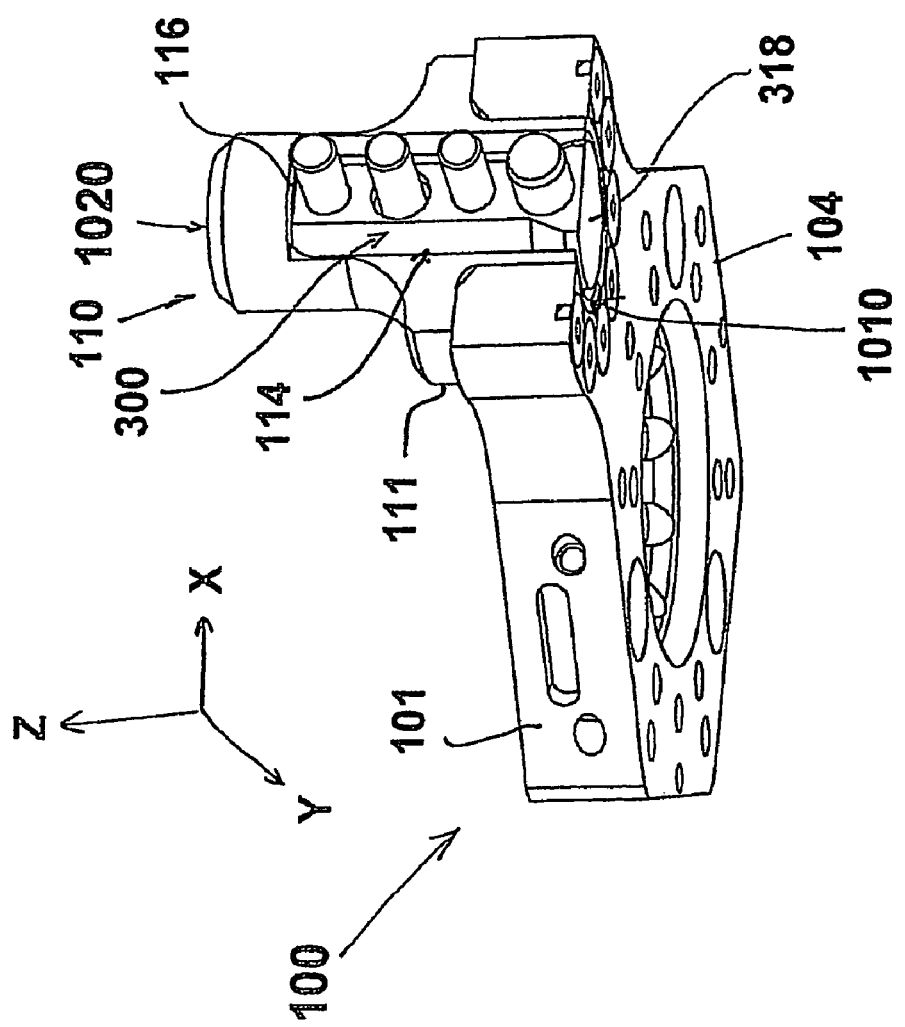

The situation in which the locating bolt 300 is in engagement with the coupling device 100 is represented in FIG. 1d. The truncated cone portion 313' of the locating bolt 300 is thereby completely surrounded by the portion 113' of the receiving means 110. Furthermore, it can be seen that the base 318 of the locating bolt ends flush with the underside 104 of the tool suspension 101.

In FIGS. 2a, b, c, an alternative embodiment of the first and second coupling device is represented, which places greater emphasis, compared with the embodiment of FIGS. 1a, b, c, d, on the operating concept of the lever effect. In addition, the second end has a completely open configuration.

In FIG. 2a, the receiving means 110 and the locating bolt 300 are shown in slightly modified embodiments in the non-connected state. The greatest difference resides in that fact that the receiving means 110 is open in the z-direction at its second end 1020. Furthermore, there is situated between the upper opening wall 116 and the second end 1020 a cylindrical portion 119 which is non-circumferential in the xy-plane. The second end 1020 is configured as a circumferential edge 1021, the circumferential edge not extending within the xy-plane but having portions which also extend downwards diagonally in the z-direction. In the embodiment shown in FIG. 2a, the tool suspension is preferably fitted on the receiving means 110, the weight of the tool suspension acting in the negative z-direction. From the weight and the removal of the weight relative to the receiving means 110, a moment acts on the suspended receiving means 110 which is taken up by the locating bolt 300.

The locating bolt 300 has complementary elements to the receiving means 110. Above the cylindrical portion 312, an extension 319 of the same against which again the frustoconical portion 313" abuts is situated. The frustoconical portion 313", differently from the embodiment of FIG. 1, is not circumferential but is truncated by the locating bolt delimitation 317.

It is intended to be explained with reference to FIG. 2b how the stationary locating bolt 300 is in engagement with the non-stationary receiving means 110 and the tool suspension secured thereon but not illustrated and takes up the weight FG of a tool so that a stable connection between locating bolt 300 and receiving means 110 comes about. The weight FG acts in the negative z-direction so that the non-circumferential cylindrical portion 119 of the recess 1000 is pressed onto the cylindrical portion 319 of the locating bolt 300 because of the first moment OM in the y-direction acting on the receiving means. The portion 313" in this embodiment takes up no or only a small part of the moment OM.

At the same time, the moment EOM acting in the negative y-direction presses the lower portion, viewed in the z-direction, of the recess 1000—inter alia in the region of the transverse boring 120—the receiving means 110 onto the portions 313 and 312 situated at the bottom in the z-direction and situated in the y-direction. In this way, the two moments OM and EOM acting on the receiving means 110 because of the weight FG are taken up by the stationary locating bolt 300.

In FIG. 2c, once again another perspective of the alternative embodiment of the coupling devices is represented. From this perspective, it can be detected that the locating bolt delimitation 317' is configured such that it ends flush with the upper edge 1021 of the receiving means 110.

In FIG. 3, the first and second coupling device are shown connected to a storage device 220 and a tool receiving plate 201, the two previously mentioned elements forming a part of the second coupling device 200. Furthermore, the first coupling device 100 with the tool suspension 101 and the receiving means 110, which are suspended on a locating bolt 300, not visible, is shown. The locating bolt 300 is thereby disposed on the lateral side plate 202 of the tool receiving plate 201. The non-visible upper opening end 116 is supported on the surface of the tool receiving plate 201.

The locating bolt 300 is connected either by means of the securing bolts 330, 331, 332, 333 or by means of an adjusting pin disposed in the bottom 318 of the locating bolt 300 to any tool receiving plate, not represented here, and according to the process illustrated and explained in FIGS. 1a-1d for laying down the first coupling device 100 onto the locating bolt 300, a connection between the receiving means 110 and the locating bolt 300 is produced. It is thereby also conceivable that it is likewise possible that the opening 114 of the receiving means 110 is not present and thus a rotationally symmetrical receiving means 110 is produced. However, it would hereby be necessary to remove the locating bolts 330, 331, 332, 333 and likewise to use an advantageously rotationally symmetrical locating bolt 300.

The receiving means 110 and the locating bolt 300, shown here, can thereby be produced in a first method step by means of turning. Only in a second operating step is the opening 114 introduced by means of milling into the receiving means 110 and borings for the securing bolts 330, 331, 332, 333 in the locating bolt 300. The securing bolts 330, 331, 332, 333 are inserted subsequently into borings and connected to a tool receiving plate 201.

In the case of the first coupling device and the connection thereof to the locating bolt 300 by means of the receiving means 110, the advantage resides in the fact that a large part of the material machining can be undertaken firstly by turning and the finished components can be produced subsequently by a few simple cuts. The cuts can thereby be introduced by means of milling or cutting.

Finally, it may be noted that aspects for production or the subject of the present invention which are not described explicitly with respect to the subject or the method, should be understood respectively both as disclosure in the sense of a production method and in the sense of the subject.

In FIGS. 4 and 5, an alternative embodiment of a first and second coupling device is shown. In FIG. 4a, a first coupling device 100' with a tool suspension 101' is shown. The tool suspension 101' differs only insubstantially from the tool suspension 101 of the preceding Figures. Thus the tool suspension 101' has an opening 102', the opening 102' serving to receive a tool and this tool being able to be picked up together with the tool suspension 101' by a robot, as emerges also from the previous embodiments. It may be noted at this point that not all the features of the embodiment shown in FIGS. 4 and 5 have been provided with a reference number. This concerns in particular features which were explained already in the preceding embodiments. These essentially identical features are however disclosed of course without an explicit reference in FIGS. 4 and 5. In FIG. 4a, in addition to the borings 140' and the half-shells 141' shown in the opening 102', fixing bolts 142' with which a connection between the tool suspension 101' and a robot is produced are represented. The coupling between a robot and the tool suspension 101' can thereby be attributed to additional coupling mechanisms, as are sufficiently known from the state of the art.

The first coupling device 100' has furthermore a receiving means 110' which is configured such that it can receive a locating bolt 300' in itself. The receiving means 110' is configured, just as in the previous embodiments, as an independent workpiece 111'. From the perspective of FIG. 4a, merely the opening 114' and also an edge of the upper opening wall 116' is visible. Furthermore a recess 1000' which is accessible via the opening 114' can be detected.

The locating bolt 300' is introduced into the recess 1000'. The shape of the recess 1000' is chosen thereby to be essentially complementary to the shape of the locating bolt 300'. Thus the locating bolt 300' has a cylindrical portion 312' which, in its end situated in the positive z-direction, has a spherical slice-shaped portion 313" which in turn comes to be situated in a portion 113'" of the recess 1000' which is configured complementarily thereto. Abutting against the cylindrical portion 312' situated in the negative z-direction, a further spherical slice-shaped portion 313" is situated, which is complementary to a lower portion 113" of the recess 1000' situated in the negative z-direction. At the upper end of the locating bolt 300' situated in the positive z-direction, the locating bolt delimitation 317' which has an additional marking 319', the meaning of which is intended to be explained subsequently, is situated.

The marking 319' is a straight line which corresponds to a marking 119' of the receiving means 110' if locating bolt and receiving means are connected to each other. With the help of the markings 319' and 119', a technician can check optically whether the first coupling device 100' is securely connected to the receiving bolt 300' of the second coupling device 200'. A secure connection is then provided when the marking 319' extends the marking 119' which is interrupted because of the hole 1021' of the receiving means 110'. An essentially continuous line which is composed of the corresponding markings 119' and 319' should therefore be detectable.

The partial portion of the second coupling device 200' represented in FIG. 4a has in addition a connecting plate 250' which is connected frictionally to the locating bolt 300' by means of two bolts 331' and 332'. The connection surface between the locating bolt 300' and the connecting plate 250' is a flat surface which is configured in the case of the locating bolt as a blank parallel to the axis of rotation of the locating bolt 300'. This means in particular that the locating bolt 300', just as the locating bolt 300 of the preceding Figures, has a flat surface which breaks the rotational symmetry and with which the locating bolt can be connected to a connecting plate or a tool receiving means or tool receiving plate. In the present case, the connection is not produced via the base of the locating bolt, situated in the negative z-direction, but via the flat surface on the side, as described previously.

It emerges clearly from FIG. 4b that the locating bolt 300', in contrast to the previous embodiments, has no adjusting pin. The self-adjusting function of the adjusting pin is achieved by means of the wings 251' of the connecting plate 250'. As can be detected clearly from FIGS. 4a and 4b, the connecting plate 250' has two wings 251' which extend preferably at the level of the lower spherical slice-shaped portion 313" and are situated thereby essentially in the plane of the flat surface of the locating bolt 300'. However, the wings can also have an inclination or curvature in the xy-plane or opposite the z-direction which corresponds to the receiving means 110' and the tool suspension 101'. Upon introduction of the locating bolt 300' into the receiving means 110', the wings 251' ensure that rotation of the first coupling device 100' in the xy-plane is no longer possible. For this reason, the side wings 251' take over the task in the present embodiment taken on by the adjusting pin of producing a standard position of the first coupling device 100' in the xy-plane.

In FIGS. 5a to d, various sections through the receiving means 110' and the locating bolt 300' are shown for better clarification. In FIGS. 5a and 5b, a section in the yz-plane is visible, the longitudinal axis or axis of rotation R being part of the sectional plane. In FIGS. 5c and 5d, a section in the xz-plane is shown, the longitudinal axis or axis of rotation R likewise being part of the illustrated plane. In FIGS. 5a and 5c, the locating bolt 300' is introduced through the opening 114' into the recess 1000', the receiving means 110' not however being lowered completely in the negative z-direction so that only a partial form-fit between the receiving means 110' and the locating bolt 300' is present. In FIGS. 5b and 5d, the state which the locating bolt 300' adopts in the receiving means 110' in its retaining position is shown.

In FIG. 5a, the inner profile of the recess 1000' of the receiving means 110' can be detected clearly. At its lower end in the z-direction, the recess 1000' has a spherical slice-shaped portion 113" which reduces its radius extending in the positive x-direction. Abutting against the spherical slice-shaped portion 113", a cylindrical portion 112' is situated. Abutting against the cylindrical portion 112', again a spherical slice-shaped portion 113'" with a preferably standard radius of curvature is situated at the upper end of the recess 1000'. The opening 114' with an opening wall 115' which merges into the upper opening wall 116' can furthermore be detected. It can be detected clearly that the length LO' of the opening 114' is smaller than the length LA' of the recess 1000'. The length difference resulting therefrom, lying between the upper opening wall 116' and the receiving means delimitation 117', forms in this embodiment a rotationally symmetrical portion, here the spherical slice-shaped portion 113'''. In FIG. 5b, the state in which the locating bolt 300' has been introduced completely into the receiving means 110' or the recess 1000' of the receiving means 110' is shown. It can be detected clearly how the spherical slice-shaped portion 313''' engages in a form-fit in the spherical slice-shaped portion 113'''. It is also detectable that the spherical slice-shaped portion 313" is situated at least partially in a form-fit in the spherical slice-shaped portion 113".

It can be detected in addition from FIGS. 5c and 5d that the radius of the cylindrical portion 112' is greater than the radius of the cylindrical portion 312' of the locating bolt 300'. Merely the spherical slice-shaped portions of the recess 1000' and of the locating bolt 300' engage directly one in the other in a form-fit. It has hereby been shown that the use of spherical geometries, such as e.g. the spherical slice-shaped portions, has improved self-adjustment compared with the frustoconical portions shown in previous embodiments. The radius of the cylindrical portion 112' thereby corresponds to the width BO' of the opening 114' in the region of the cylindrical portion 112', the width BO' being greater than the radius or the width of the cylindrical portion 312' of the locating bolt 300'. The width of the spherical slice-shaped portion 113" is greater than the width BO'. Correspondingly, the width of the opening 114' in this spherical slice-shaped portion 113" is likewise greater than the width BO'. However, also the width in the region of the spherical slice-shaped portion 113' is greater than or equal to the width of the corresponding spherical slice-shaped portion 313", the width being comparable respectively in the form-fit engagement state between the locating bolt and the receiving means. The width of the opening and also of the locating bolt can be varied in the xy-plane therefore along the z-direction, however portions corresponding to each other are chosen respectively such that the width of the opening is greater than or equal to the width of the locating bolt.

From FIGS. 5a and 5b, a flat surface 325' can furthermore be detected, which surface is configured for connecting the locating bolt 300' for example to the connecting plate 250' or to the tool receiving plate or tool receiving plate, as shown in FIG. 3 and, in the illustration of FIG. 4, is covered by a partial portion of the connecting plate 250'. The bolts 331' and 332' or the borings thereof are also detectable.

The embodiment described in FIGS. 4 and 5, because of the spherical slice-shaped portions of the locating bolt and because of the receiving means, offers some advantages relative to the frustoconical portions of the previous embodiments. On the one hand, a dynamic clamping length ratio can be calculated by the choice of radii of the different portions so that tilting of the tool suspension 101' (in particular with the tool secured in the tool suspension) is significantly reduced. This leads to the fact that, when laying down and picking up the first coupling device on the part of the robot, no additional tilting movement is necessary. Hence the direction of travel when collecting the tool and bringing the tool is exactly the same, which significantly simplifies programming of the robot. Because of the now small undercut, formed by the length difference LO' and LA', the tool is immediately free even after a short robot movement in the positive z-direction and can be removed completely from the locating bolt by a movement in the y-direction.

In the embodiments shown, here the second coupling device respectively has only a single locating bolt which engages in a form-fit in a single receiving means. This embodiment is preferred, however it is also possible to use for example two locating bolts, parallel to each other, with receiving means corresponding thereto.

The invention claimed is:

1. A tool mounting device having at least a first coupling device and a second coupling device which can be connected to the first coupling device, the first coupling device having at least one receiving means, the second coupling device having at least one locating bolt and either the first or the second coupling device having a tool suspension which can be connected to a tool, in particular a robot tool and the receiving means having a first and a second end along a longitudinal axis, wherein the receiving means has at least one recess and an opening, the opening extending from the first end in the direction of the second end with a length and the length of the opening being smaller than a length of the recess and a width of the opening being greater than or equal to a width of the locating bolt.

2. The tool mounting device according to claim 1, wherein the locating bolt is secured laterally or perpendicularly on a tool receiving plate or the tool suspension.

3. The tool mounting device according to claim 1, wherein the locating bolt can be brought into a form-fit, detachable engagement at least partially with the receiving means.

4. The tool mounting device according to claim 1, wherein the recess has at least one portion for partial or complete enclosure of a cylinder or of a truncated cone, an axis of inertia with a greatest moment of inertia of the cylinder and/or truncated cone being configured essentially parallel to the longitudinal axis.

5. The tool mounting device according to claim 1, wherein the receiving means has a transverse boring for receiving an adjusting pin.

6. The tool mounting device according to claim 1, wherein the locating bolt has cylindrical and/or frustoconical portions.

7. The tool mounting device according to claim 1, wherein the locating bolt has at least one adjusting pin and/or at least one securing bolt.

8. The tool mounting device according to claim 1, wherein the tool suspension has at least one opening.

9. The tool mounting device according to claim 1, wherein the tool suspension has at least one further boring for fixing a tool.

\* \* \* \* \*

UNITED STATES PATENT AND TRADEMARK OFFICE
CERTIFICATE OF CORRECTION

PATENT NO. : 8,360,377 B2
APPLICATION NO. : 12/734626
DATED : January 29, 2013
INVENTOR(S) : Geyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this
First Day of September, 2015

Michelle K. Lee
*Director of the United States Patent and Trademark Office*